United States Patent
Diguet et al.

(10) Patent No.: US 12,352,957 B2
(45) Date of Patent: Jul. 8, 2025

(54) PROJECTION ASSEMBLY FOR A HEAD-UP DISPLAY (HUD) WITH P-POLARIZED RADIATION COMPRISING A PROJECTOR ORIENTED TOWARD A HUD REGION

(71) Applicant: SAINT-GOBAIN GLASS FRANCE, Courbevoie (FR)

(72) Inventors: Antoine Diguet, Paris (FR); Jan Hagen, Bonn (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 431 days.

(21) Appl. No.: 18/004,269

(22) PCT Filed: Sep. 2, 2021

(86) PCT No.: PCT/EP2021/074237
§ 371 (c)(1),
(2) Date: Jan. 4, 2023

(87) PCT Pub. No.: WO2022/058178
PCT Pub. Date: Mar. 24, 2022

(65) Prior Publication Data
US 2023/0280588 A1  Sep. 7, 2023

(30) Foreign Application Priority Data
Sep. 21, 2020 (EP) .................................... 20197086

(51) Int. Cl.
*G02B 27/01* (2006.01)
(52) U.S. Cl.
CPC ............................... *G02B 27/0101* (2013.01)

(58) Field of Classification Search
CPC ......... B32B 17/10119; B32B 17/10201; B32B 17/10229; B32B 17/10449
See application file for complete search history.

(56) References Cited

U.S. PATENT DOCUMENTS 6,979,499 B2 * 12/2005 Walck ............... G02B 27/0101
359/359
2017/0242247 A1 * 8/2017 Tso ....................... B60K 35/23
(Continued)

FOREIGN PATENT DOCUMENTS

| CN | 204143067 U | 2/2015 |
| DE | 10 2014 220189 A1 | 4/2016 |

(Continued)

OTHER PUBLICATIONS

International Search Report as issued in International Patent Application No. PCT/EP2021/074237, dated Oct. 25, 2021.
(Continued)

*Primary Examiner* — Paul C Lee
(74) *Attorney, Agent, or Firm* — Pillsbury Winthrop Shaw Pittman LLP

(57) ABSTRACT

A projection assembly for a head-up display (HUD), includes a composite pane with an electrically conductive coating, and a projector. The radiation of the projector is predominantly p-polarized. The electrically conductive coating has a first surface region within a HUD region and a second surface region outside the HUD region. The electrically conductive coating has at least one sub-region within the first surface region. The electrically conductive coating in the first surface section within the HUD region can be obtained from the electrically conductive coating in the second surface section using a subtractive method.

20 Claims, 6 Drawing Sheets

(56) References Cited

U.S. PATENT DOCUMENTS

Figure 1:
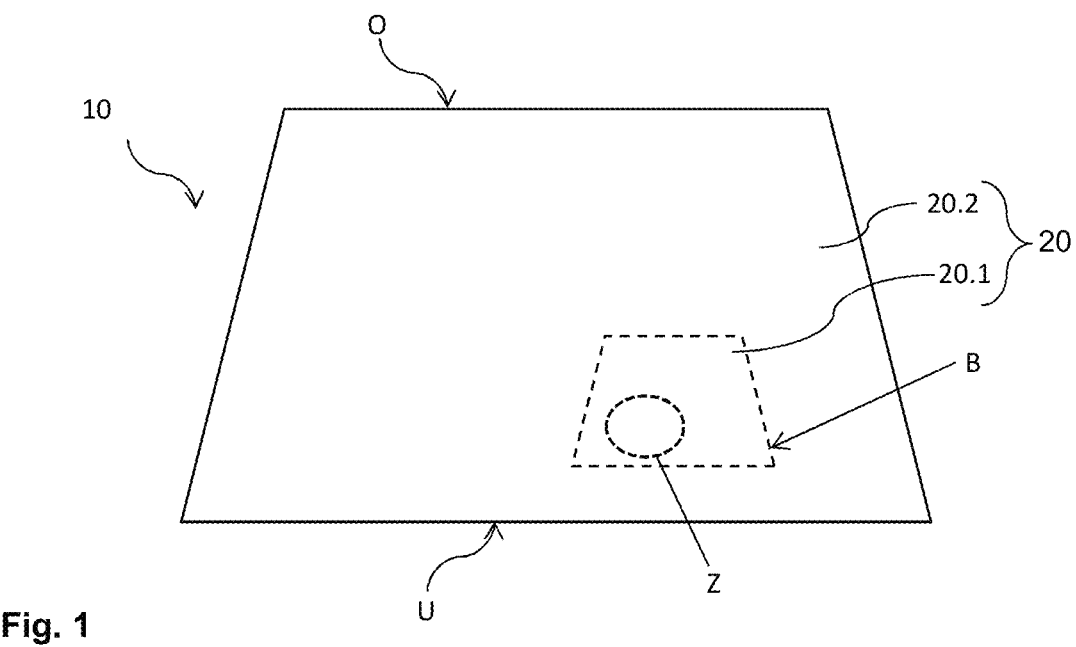

2019/0329529 A1\* 10/2019 Schulz .............. B32B 17/10174
2020/0073121 A1\* 3/2020 Banyay .................. B60K 35/60
2020/0371355 A1\* 11/2020 Wagner .............. G02B 27/0018

FOREIGN PATENT DOCUMENTS

| EP | 1 880 243 A2 | 1/2008 |
|---|---|---|
| EP | 1 800 855 B1 | 2/2013 |
| WO | WO 2006/122305 A2 | 11/2006 |
| WO | WO 2009/071135 A1 | 6/2009 |
| WO | WO 2019/046157 A1 | 3/2019 |

OTHER PUBLICATIONS

Neumann, A., "Simulation-Based Metrology for Testing Head-Up Displays," Dissertation at the Informatics Institute of Munich Technical University (Munich: University Library of Munich TU, 2012), in particular chapter 2 "The Head-Up Display", (2012), Retrieved from the Internet: URL: <https://mediatum.ub.tum.de/1079689?id=1079689&change_language=en>. (English abstract on p. 5 of document).

\* cited by examiner

PROJECTION ASSEMBLY FOR A HEAD-UP DISPLAY (HUD) WITH P-POLARIZED RADIATION COMPRISING A PROJECTOR ORIENTED TOWARD A HUD REGION

CROSS-REFERENCE TO RELATED APPLICATIONS

This application is the U.S. National Stage of PCT/EP2021/074237, filed Sep. 2, 2021, which in turn claims priority to European patent application number 20197086.0 filed Sep. 21, 2020. The content of these applications are incorporated herein by reference in their entireties.

The invention relates to a projection assembly for a head-up display and its use.

Modern automobiles are increasingly equipped with so-called head-up displays (HUDs). With a projector, typically in the region of the dashboard, images are projected onto the windshield, reflected there, and perceived by the driver as a virtual image behind the windshield (from his perspective). Thus, important data can be projected into the drivers field of vision, for example, the current driving speed, navigation or warning messages, which the driver can perceive without having to divert his glance from the road. Head-up displays can thus contribute significantly to an increase in traffic safety.

HUD projectors are predominantly operated with s-polarized radiation and irradiate the windshield at an angle of incidence of about 65%, which is near Brewster's angle for an air/glass transition (56.5° for soda lime glass). The problem arises that the projector image is reflected on both external surfaces of the windshield. As a result, in addition to the desired primary image, a slightly offset secondary image also appears, the so-called ghost image ("ghost"). The problem is usually mitigated by arranging the surfaces at an angle relative to one another, in particular by using a wedge-like intermediate layer for the lamination of windshields implemented as a composite pane such that the primary image and the ghost image are superimposed on one another. Composite glasses with wedge films for HUDs are known, for example, from WO2009/071135A1, EP1800855B1, or EP1880243A2.

The wedge films are expensive such that production of such a composite pane for an HUD is quite cost intensive. Consequently, there is a need for HUD projection assemblies that work with windshields without wedge films. For example, it is possible to operate the HUD projector with p-polarized radiation, which is not significantly reflected by the pane surfaces. Instead, the windshield has a reflection coating as a reflection surface for the p-polarized radiation. DE102014220189A1 discloses such an HUD projection assembly that is operated with p-polarized radiation. Proposed, among other things, as a reflecting structure is a single metallic layer with a thickness of 5 nm to 9 nm, made, for example, of silver or aluminum. WO2019046157A1 also discloses an HUD with p-polarized radiation, wherein a reflection coating with at least two metallic layers is used.

US2017242247A1 discloses another HUD projection assembly with a reflection coating for p-polarized radiation. The reflection coating can contain one or a plurality of conductive silver layers, and dielectric layers in addition. However, the reflection spectrum has a distinctly curved shape in the relevant spectral range such that reflectance is relatively strongly wavelength-dependent. This is disadvantageous in terms of color-neutral display of the HUD projection.

CN204143067U describes an HUD projection assembly composed of a light source for p-polarized light and a composite pane, wherein the composite pane has a transparent layer that comprises at least two dielectric layers and at least one metallic layer.

There is a need for projection assemblies for HUDs with reflection coatings that ensure high transmittance in the visible spectral range and have high reflectivity for p-polarized radiation and allow a color-neutral display. Besides these specific requirements in the projection region of the HUD, the lowest possible transmittance of infrared radiation and viewer-friendly reflection properties in the visible range of the light spectrum are also desired, in particular outside the HUD region. The object of the present invention is to provide such an improved projection assembly.

The object of the present invention is accomplished according to the invention by a projection assembly in accordance with claim 1. Preferred embodiments are apparent from the dependent claims.

The projection assembly according to the invention for a head-up display (HUD) comprises at least a composite pane with an electrically conductive coating and a projector that generates predominantly p-polarized radiation and that is oriented toward the HUD region. The composite pane comprises an outer pane and an inner pane that are joined to one another via a thermoplastic intermediate layer. The electrically conductive coating is divided into a first surface region that is positioned within the HUD region and a second surface region that is positioned outside the HUD region. Within the first surface region, the electrically conductive coating has at least one sub-region, in which the electrically conductive coating consists of, in the following order, a first dielectric layer or layer sequence, an electrically conductive layer based on silver, and a second dielectric layer or layer sequence and is suitable for reflecting p-polarized radiation. The electrically conductive coating within the second surface region has at least one sub-region, in which the electrically conductive coating comprises, in the following order, at least a first dielectric layer or layer sequence, a first electrically conductive layer based on silver, a second dielectric layer or layer sequence, a second electrically conductive layer based on silver, and a third dielectric layer or layer sequence. The electrically conductive coating in the first surface section within the HUD region can be obtained from the electrically conductive coating in the second surface section using a subtractive method.

According to the invention, the composite pane according to the invention has, in at least one sub-region within the second surface region, an electrically conductive coating comprising at least two electrically conductive layers based on silver. Such coatings with two functional silver layers advantageously inhibit the transmittance of infrared radiation through the composite pane. As a result, undesirable heating of a vehicle interior due to excessive solar transmittance can be avoided. Moreover, an improved visual appearance of the composite pane can be achieved by means of electrically conductive coatings with at least two functional silver layers. Layer structures with only one functional silver layer sometimes exhibit undesirably strong reflection on the surface of the pane facing the surroundings in the installed state of the composite pane. This is avoided with the electrically conductive coating present according to the invention in the second surface region outside the HUD region.

In the first surface region of the electrically conductive coating, which is arranged within the HUD region of the composite pane, there is, in at least one sub-region, only one coating, comprising a single functional silver-based layer, i.e., an electrically conductive layer based on silver. This is suitable for reflecting p-polarized radiation. The electrically conductive coating in the first surface region can be obtained from the electrically conductive coating in the second surface region using a subtractive method. In the first surface region, the layer stack of the electrically conductive coating bus comprises part of the area cross-section of the electrically conductive coating in the second surface region, with further layers present in the second surface region, which layers extend beyond the layer stack of the first surface region. In this way, an electrically conductive coating can be provided in the HUD region, which coating is, in particular, optimized for reflection of p-polarized light; whereas, in the second surface region outside the HUD region, there is a coating that meets the requirements differing therefrom for a coating to be used even over a large area on a composite pane. The layer stack of the electrically conductive coating which matches in sections within the first surface region and within the second surface region facilitates the production of the composite pane.

According to the invention, the layer stack in the first surface region can be obtained from the layer stack of the electrically conductive coating in the second surface region using a subtractive method. The feature that the electrically conductive coating in the first surface region can be obtained from the coating in the second surface region relates to the composition and layer sequence of the electrically conductive coating and not to the production process of the coating. Thus, it is crucial that when considering the layer stack of the electrically conductive coating in the second surface region, a part of the layer stack can be done away with and this results in the layer stack of the electrically conductive coating in the first surface region. It is immaterial whether subtractive methods were used to obtain the layer stack of the electrically conductive coating in the first surface region or whether the coating was applied in both surface regions independently of one another by means of additive methods.

According to the invention, p-polarized radiation is used for generating the HUD image, and the composite pane has an electrically conductive coating that sufficiently reflects p-polarized radiation. Since the angle of incidence of about 65° typical for HUD projection assemblies is relatively close to Brewster's angle for an air/glass transition (56.5°, soda lime glass), the p-polarized radiation is hardly reflected by the pane surfaces, but instead primarily by the conductive coating. Consequently, ghost images do not occur or are hardly perceptible such that the use of an expensive wedge film can be dispensed with. In addition, the HUD image is recognizable even for wearers of polarization-selective sunglasses, which typically allow only p-polarized radiation to pass through and block s-polarized radiation. The electrically conductive coating in the first surface region has high reflectivity relative to p-polarized radiation in the spectral range from 450 nm to 650 nm, which is relevant for HUD displays (HUD projectors typically operate at wavelengths of 473 nm, 550 nm, and 630 nm (RGB)). This results in a high-intensity HUD image. The single silver layer does not excessively reduce light transmittance such that the pane can even be used as a windshield. The ratio according to the invention of the optical thicknesses of the upper and lower dielectric layer sequence causes a smoothing of the reflection spectrum such that a color-neutral display is ensured. The advantageous reflection properties, in particular the uniformity of the spectrum, extend even beyond the HUD-relevant spectral range to a spectral range from 400 nm to 680 nm such that in addition to a good HUD display, a good overall impression of the pane is also achieved in the first surface region without a disturbing color cast. These are major advantages of the present invention.

The projection assembly according to the invention for a head-up display (HUD) includes at least a composite pane that is provided with an electrically conductive coating and a projector. As is usual with HUDs, the projector irradiates a region of the composite pane where the radiation is reflected in the direction of the viewer (in the case of a composite pane as a vehicle windshield: the driver), generating a virtual image, which the viewer perceives, from his perspective, as behind the composite pane. The region of the composite pane that can be irradiated by the projector is referred to as an HUD region. The beam direction of the projector can typically be varied by mirrors, in particular vertically, in order to adapt the projection to the body size of the viewer. The region in which the eyes of the viewer must be situated with a given mirror position is referred to as the "eyebox window". This eyebox window can be shifted vertically by adjustment of the mirrors, with the entire area thus available (i.e., the superimposing of all possible eyebox windows) referred to as the "eyebox". A viewer situated within the eyebox can perceive the virtual image. This, of course, means that the eyes of the viewer must be situated within the eyebox, not the entire body.

The technical terms used here from the field of HUDs are generally known to the person skilled in the art. For a detailed presentation, reference is made to Alexander Neumann's dissertation "Simulation-Based Measurement Technology for Testing Head-Up Displays" at the Institute of Computer Science at the Technical University of Munich (Munich: University Library of the Technical University of Munich, 2012), in particular Chapter 2 "The Head-Up Display".

The composite pane comprises an outer pane and an inner pane that are joined to one another via a thermoplastic intermediate layer. The composite pane is intended, in a window opening of a vehicle, to separate the interior from the external surroundings. In the context of the invention, the term "inner pane" refers to the pane of the composite pane facing the vehicle interior. The term "outer pane" refers to the pane facing the external surroundings. The composite pane is preferably the windshield or roof panel of a motor vehicle, in particular of a passenger car or a truck.

The composite pane in its embodiment as a windshield has an upper edge and a lower edge as well as two side edges extending therebetween. "Upper edge" refers to that edge that is intended to point upward in the installed position. "Lower edge" refers to that edge that is intended to point downward in the installed position. The upper edge is also often referred to as the "roof edge"; and the lower edge, as the "engine edge".

The outer pane and the inner pane have in each case an exterior-side surface and an interior-side surface and a peripheral side edge extending therebetween. In the context of the invention, "exterior-side surface" refers to that primary surface that is intended, in the installed position, to face the external surroundings. In the context of the invention, "interior-side surface" refers to that primary surface that is intended, in the installed position, to face the interior. The interior-side surface of the outer pane and the exterior-side surface of the inner pane face each other and are joined to one another by the thermoplastic intermediate layer.

The projector is oriented toward the HUD region of the composite pane. The radiation of the projector is predominantly p-polarized. The reflection coating is suitable for reflecting p-polarized radiation. As a result, a virtual image that can be perceived by the viewer, from his perspective, as behind the composite pane is generated from the projector radiation. In the case of a composite pane according to the invention as a windshield, the driver of the vehicle perceives the virtual image as being situated on the road.

The electrically conductive coating comprises a first surface region and a second surface region. The first surface region of the electrically conductive coating lies within the HUD region of the composite pane. Accordingly, this is the region of the electrically conductive coating toward which the p-polarized radiation of the projector is oriented. The second surface region of the electrically conductive coating is arranged outside the HUD region of the composite pane. Preferably, the second surface region surrounds the first surface region, with the first surface region and the second surface region together totaling the region of the composite pane covered by the electrically conductive coating. The electrically conductive coating is applied over a large area of the composite pane, with, preferably, at least the through-vision region of the composite pane being covered to large extent, preferably at least 80%, particularly preferably at least 90%, by the electrically conductive coating. The through-vision region of the composite pane is defined here as the region that is visible in the installed state of the composite pane in the opening to be glazed and is not covered either by fastening elements or by an opaque masking print. In particular, a peripheral edge region of the composite pane that is arranged adjacent the peripheral edge of the composite pane is preferably free of electrically conductive coating. As a result, possible corrosion of the coating due to moisture entering at the peripheral edge is avoided. In addition, a coating-free edge region is advantageous in terms of improved transmittance of high-frequency electromagnetic radiation through the composite pane. A coating-free edge region can be produced, for example, by removing the electrically conductive coating. Optionally, other de-coated regions can also be provided, for example, in the region of a camera window or a sensor window. The electrically conductive coating in the second surface region is optimized for large-area application on the composite pane in terms of its low solar transmittance and its attractive visual appearance, whereas the electrically conductive coating in the first surface region is selected in light of its reflection properties for p-polarized light, but is suitable only to a limited extent for large-area application on the pane in light of its solar transmittance and its appearance. Preferably, the first surface region of the electrically conductive coating occupies an area share of at most 30%, particularly preferably at most 20%, in particular at most 10% of the total area of the composite pane. The first and the second surface region can, in each case, be designed as continuous surfaces, or they can also be composed of different partial surfaces. In particular, the first surface region can, for example, consist of two or more regions arranged independently of one another, with which a projector is associated in each case. In this way, multiple HUD images can be generated in regions optimized for reflection of p-polarized radiation.

In the context of the invention, if a first layer is arranged "above" a second layer, this means that the first layer is arranged farther from the substrate on which the coating is applied than the second layer. In the context of the invention, if a first layer is arranged "below" a second layer, this means that the second layer is arranged farther from the substrate than the first layer. The first dielectric layer or layer sequence can also be referred to as the "lower" dielectric layer or layer sequence and is the one of the dielectric layers that is situated nearest the substrate. The second dielectric layer or layer sequence is the one of the dielectric layers that is arranged on the substrate as the next following dielectric layer above the first dielectric layer. The first electrically conductive layer is situated between the first dielectric layer or layer sequence and the second dielectric layer or layer sequence.

When a layer is based on a material, the layer consists for the most part of this material, in particular substantially of this material, in addition to any impurities or dopants.

In a preferred embodiment, the electrically conductive coating within the entire first surface region consists of, in the following order, a first dielectric layer or layer sequence, an electrically conductive layer based on silver, and a second dielectric layer or layer sequence and is suitable for reflecting p-polarized radiation. Thus, there is a substantially uniform coating within the HUD region of the composite pane, with sub-regions with different layer structure being avoided within the HUD region. This yields advantages in the production method since a uniform and identical de-coating of the first surface region is considerably easier to realize than a structuring of different types of sub-regions. Moreover, a homogeneous HUD image is achieved.

In another preferred embodiment, the electrically conductive coating has, within the first surface region, a regular or irregular grid of first regions and second regions. Within the first regions, the electrically conductive coating consists of, in the following order, a first dielectric layer or layer sequence, an electrically conductive layer based on silver, and a second dielectric layer or layer sequence and is suitable for reflecting p-polarized radiation. In the second regions, the electrically conductive coating corresponds to the layer stack of the electrically conductive coating in the second surface region. In this way, regions that correspond in their visual appearance to the coating of the second surface regions are also retained within the first surface region. Thus, the first surface region is integrated in a visually inconspicuous manner. Preferably, the first and second regions are arranged in the form of a regular grid. The first regions and the second regions can be identical or different in their shape. Identical first and second regions can be realized, for example, as a checkerboard pattern or a honeycomb pattern. Preferably, the first regions are realized in the form of cutouts within the electrically conductive coating, with the second region resulting as surrounding the cutouts. Within the cutouts, layers of the electrically conductive coating are removed such that the remaining layer stack within the first regions consists of a first dielectric layer or layer sequence, an electrically conductive layer based on silver, and a second dielectric layer. Here, the first regions take, for example, the form of a grid and are surrounded by a continuous second region. This grid can, for example, be square or hexagonal. First regions with a functional silver layer alternate with second regions in which there are at least two functional silver layers. The overall reflectivity for p-polarized radiation within the first surface region is slightly degraded in this grid-like design, compared to a layer system with only one functional silver layer present over the entire surface within the first surface region. The first and/or second regions preferably have an edge length of 50 µm to 500 µm, with the edge length determined as the maximum extent of the region along one direction. It has been found that a good compromise between visual appearance and reflectivity is achieved when the size of the first and/or second regions is designed with an edge length of 50 µm to 150 µm, for example, 100 µm.

In a particularly preferred embodiment of the invention, the two embodiments just described are combined such that there is a regular grid of first and second regions only along the peripheral edge of the first surface region, where the first surface region and second surface region are adjacent one another. A continuous region with only one functional silver layer is situated in the surface center of the first surface region, i.e., outside the edge region adjacent the peripheral edge. Thus, the desired high reflectivity for p-polarized radiation exists in the surface center of the first surface region, where most of the HUD image is visible. In contrast, in the edge region of the first surface region, the transition between the coating in the first surface region and in the second surface region is concealed and the composite pane is thus more pleasing visually.

The electrically conductive coating advantageously has, at least in the first surface region, at least one sub-region in which the first dielectric layer or layer sequence has a refractive index of at least 1.9 and/or the second dielectric layer or layer sequence has a refractive index of at least 1.9. Preferably, in the entire first surface region, the first dielectric layer or layer sequence and the second dielectric layer or layer sequence have in each case a refractive index of at least 1.9. Particularly preferably, in the second surface region as well, the first dielectric layer or layer sequence, the second dielectric layer or layer sequence, the third dielectric layer or layer sequence, and optional additional dielectric layers or layer sequences have a refractive index of at least 1.9 in each case. An embodiment of the invention using low-refractive layers would, in principle, be possible, but silicon oxide layers in particular come into consideration as low-refractive layers with a refractive index of less than 1.9. However, silicon oxide layers have low deposition rates in magnetron-enhanced cathodic sputtering. However, the reflection coating according to the invention can be produced quickly and economically using high-refractive layers with a refractive index of at least 1.9.

In the context of the present invention, refractive indices are in principle indicated based on a wavelength of 550 nm. The optical thickness is the product of the geometric thickness and the refractive index (at 550 nm). The optical thickness of a layer sequence is calculated as the sum of the optical thicknesses of the individual layers. The refractive index can, for example, be determined by means of ellipsometery. Ellipsometers are commercially available, for example, from the company Sentech.

Preferably, the ratio of the optical thickness of the second dielectric layer or layer sequence to the optical thickness of the first dielectric layer or layer sequence is at least 1.7. It has, surprisingly, been shown that this asymmetry of the optical thicknesses results, on the one hand, in a significantly smoother reflection spectrum relative to p-polarized radiation such that there is relatively constant reflectance over the entire relevant spectral range (400 nm to 680 nm). This ensures a color-neutral display of the HUD projection, and a color-neutral overall impression of the pane is achieved.

The preferred ratio of the optical thicknesses is calculated as the quotient of the optical thickness of the second dielectric layer or layer sequence (dividend) divided by the optical thickness of the first dielectric layer or layer sequence (divisor).

In a preferred embodiment, the ratio of the optical thickness of the second dielectric layer or to layer sequence to the optical thickness of the first dielectric layer or layer sequence is at least 1.8, particularly preferably at least 1.9. This yields particularly good results.

The electrically conductive coating is preferably applied to one of the surfaces of the two panes facing the thermoplastic intermediate layer, i.e., the interior-side surface of the outer pane or the exterior-side surface of the inner pane. Alternatively, the electrically conductive coating can also be arranged within the thermoplastic intermediate layer, for example, applied to a carrier film that is arranged between two thermoplastic bonding films. The electrically conductive coating is transparent, which means, in the context of the invention, that it has average transmittance in the visible spectral range of at least 70%, preferably at least 80%, and thus does not substantially restrict vision through the pane. In one embodiment of the invention, at least 80% of the pane surface is provided with the electrically conductive coating according to the invention. In particular, the electrically conductive coating is applied to the pane surface over its entire area with the exception of a peripheral edge region and, optionally, a local region intended to ensure the transmittance of electromagnetic radiation through the composite pane as communication windows, sensor windows, or camera windows, and, consequently, are not provided with the electrically conductive coating. The peripheral uncoated edge region has, for example, a width of up to 20 cm. It prevents direct contact of the electrically conductive coating with the surrounding atmosphere such that the coating is protected, in the interior of the windshield, against corrosion and damage.

The electrically conductive coating according to the invention has IR-reflecting properties due to the electrically conductive silver layer such that it functions as a sun protection coating that reduces the heating of the vehicle interior by reflecting thermal radiation. The electrically conductive coating can also be used as a heating coating when it is electrically contacted such that a current flows through it, heating the coating.

In the spectral range from 400 nm to 680 nm, the composite pane provided with the electrically conductive coating preferably has, in the first surface region, an averaged reflectance relative to p-polarized radiation of at least 10%, particularly preferably of at least 15%. This produces a sufficiently high intensity projection image. The reflectance is measured with an angle of incidence of 65° relative to the interior-side surface normal, which corresponds approx. to the irradiation from conventional projectors. The spectral range from 400 nm to 680 nm was used to characterize the reflection properties because the optical impression of a viewer is primarily shaped by this spectral range. It also covers the relevant wavelengths for the HUD display (RGB: 473 nm, 550 nm, 630 nm). The high reflectance, along with a relatively simple layer structure, is a major advantage of the present invention. Particularly good results are achieved when the reflectance in the entire spectral range from 400 nm to 680 nm is at least 15%, preferably at least 20%, such that the reflectance in the specified spectral range is not below the specified values at any point.

Reflectance describes the proportion of the total incident radiation that is reflected. It is indicated in % (based on 100% incident radiation) or as a unitless number from 0 to 1 (normalized to the incident radiation). Plotted as a function of the wavelength, it forms the reflection spectrum. In the context of the present invention, the statements concerning reflectance relative to p-polarized radiation are based on the reflectance measured with an angle of incidence of 65° relative to the interior-side surface normal. The data regarding the reflectance or the reflection spectrum are based on a reflection measurement with a light source that emits uniformly with a normalized radiation intensity of 100% in the spectral range under consideration.

In order to achieve the most color-neutral display of the projector image possible, the reflection spectrum should be as smooth as possible and should have no pronounced local minima and maxima. In the spectral range from 400 nm to 680 nm, the difference between the maximally occurring reflectance and the mean of the reflectance as well as the difference between the minimally occurring reflectance and the mean of the reflectance in a preferred embodiment should be at most 3%, particularly preferably at most 2%. Here again, the reflectance relative to p-polarized radiation is measured with an angle of incidence of 65° relative to the interior-side surface normal. The resultant difference is to be considered as the absolute deviation of reflectance (reported in %), not as a percentage deviation relative to the mean. The desired smoothness of the reflection spectrum in the first surface region can easily be achieved with the electrically conductive coating according to the invention due to its exactly one electrically conductive layer in the first surface region.

Alternatively, the standard deviation in the spectral range from 400 nm to 680 nm can be used as a measure of the smoothness of the reflection spectrum. It is preferably less than 1%, particularly preferably less than 0.9%, most particularly preferably less than 0.8%.

The above-mentioned desired reflection characteristics are achieved in particular through the choice of the materials and thicknesses of the individual layers as well as the structure of the dielectric layer sequence. The electrically conductive coating can thus be suitably adjusted.

The electrically conductive coating is a thin-layer stack, i.e., a layer sequence of thin individual layers. This thin-layer stack contains, in at least one sub-region of the first surface region, preferably in the entire first surface region, exactly one electrically conductive layer based on silver. The electrically conductive layer based on silver gives the coating the basic reflecting properties and also an IR-reflecting effect and electrical conductivity. The electrically conductive layer based on silver can also be referred to simply as a silver layer. The electrically conductive coating contains, in this sub-region of the first surface region, exactly one silver layer, i.e., not more than one silver layer, and also no other silver layers are arranged above or below the electrically conductive coating. It is a particular advantage of the present invention that the desired reflection properties can be achieved with one silver layer without excessively reducing the transmittance, as would be the case if multiple conductive layers were used. However, it is also possible for other electrically conductive layers that do not substantially contribute to the electrical conductivity of the electrically conductive coating but serve a different purpose to be present. This applies in particular to metallic blocking layers with geometric thicknesses of less than 1 nm, which are preferably arranged between the silver layer and the dielectric layer sequences.

The first electrically conductive layer and the second electrically conductive layer are based on silver. The conductive layers preferably contain at least 90 wt.-% silver, particularly preferably at least 99 wt.-% silver, most particularly preferably at least 99.9 wt.-% silver. The silver layers can have dopants, for example, paladium, gold, copper, or aluminum. The geometric layer thickness of the silver layers is preferably at most 15 nm, particularly preferably at most 14 nm, most particularly preferably at most 13 nm. As a result, advantageous reflectivity in the IR range can be achieved, without excessively reducing transmittance. The geometric layer thickness of the silver layer is preferably at least 5 nm, particularly preferably at least 8 nm. Thinner silver layers can lead to dewetting of the layer structure. Particularly preferably, the geometric layer thickness of the silver layers is from nm to 14 nm or from 11 nm to 13 nm.

The electrically conductive coating contains, preferably alternating with the silver layers, independently of one another in each case, a dielectric layer or a dielectric layer sequence with a refractive index of at least 1.9. The dielectric layers can, for example, be based on silicon nitride, zinc oxide, tin-zinc oxide, mixed silicon-metal nitrides, such as silicon-zirconium nitride, zirconium oxide, niobium oxide, hafnium oxide, tantalum oxide, tungsten oxide, or silicon carbide. The oxides and nitrides mentioned can be deposited stoichiometrically, substoichiometrically, or superstoichiometrically. They can have dopants, for example, aluminum, zirconium, titanium, or boron.

The optical thickness of the second dielectric layer or layer sequence is preferably from 100 nm to 200 nm, particularly preferably from 130 nm to 170 nm. The optical thickness of the first dielectric layer or layer sequence is preferably from 50 nm to 100 nm, particularly preferably from 60 nm to 90 nm. Good results are achieved with this in terms of a significantly smoother reflection spectrum for p-polarized radiation. The first dielectric layer and the second dielectric layer are present in the first surface region, as a result of which they have particular relevance for the reflectivity in the HUD region. The third dielectric layer and, optionally, further dielectric layers are arranged in the second surface region outside the HUD region. Accordingly, they are not relevant for the properties of the HUD region. For this reason, the optical thicknesses of the third dielectric layer or layer sequence and possibly further dielectric layers or sequences can be selected within larger ranges. Preferably, the optical thickness of the third dielectric layer or layer sequence is 50 nm to 200 nm, particularly preferably 60 nm to 150 nm. The optical thicknesses of further dielectric layers or layer sequences can be freely selected in the same range.

In an advantageous embodiment, a dielectric layer, which can be referred to as an anti-reflection layer is, in each case, arranged above and below the silver layer. Such an anti-reflection layer is preferably in each case a component of the first dielectric layer or layer sequence, of the second dielectric layer or layer sequence, and the third dielectric layer or layer sequence. The anti-reflection layers are preferably based on an oxide, for example, tin oxide, and/or a nitride, for example, silicon nitride, particularly preferably based on silicon nitride. Silicon nitride has proved itself due to its optical properties, its easy availability, and its high mechanical and chemical stability. The silicon is preferably doped, for example, with aluminum or boron. In the case of dielectric layer sequences, the layer based on silicon nitride is preferably the top layer of the upper, i.e., of the second or third, layer sequence or the bottom layer of the lower, i.e., the first layer sequence. The geometric thickness of the upper anti-reflection layer, which is present in the second and/or third dielectric layer or layer sequence, is preferably from 25 nm to 100 nm, particularly preferably from 30 nm to 80 nm, in particular from 60 nm to 70 nm. The geometric thickness of the lower anti-reflection layer, which is in the first dielectric layer or layer sequence, is preferably from 10 nm to 50 nm, particularly preferably from 15 nm to 40 nm, in particular from 20 nm to 35 nm.

Preferably, the layer stack of the third dielectric layer ends with an anti-reflection layer. Preferably, the second anti-reflection layer is provided as the final layer within the first surface region. The second anti-reflection layer accordingly forms the layer facing away from the substrate that is the farthest from the substrate.

In addition to the anti-reflection layer, further dielectric layers with a refractive index of at least 1.9 can optionally be present. Thus, the layer sequences of the dielectric layers can, independently of one another, contain matching layers to improve the reflectivity of the silver layer. The matching layers are preferably based on zinc oxide, particularly preferably zinc oxide $ZnO_{1-\delta}$ with $0 \leq \delta \leq 0.01$. The matching layers further preferably contain dopants. The matching layers can, for example, contain aluminum-doped zinc oxide (ZnO:Al). The zinc oxide is preferably deposited substoichiometrically with respect to oxygen in order to avoid reaction of excess oxygen with the silver-containing layer. The matching layers are preferably arranged between the silver layer and the anti-reflection layer. The geometric thickness of the matching layer is preferably from 5 nm to 30 nm, particularly preferably from 8 nm to 12 nm.

Refractive-index-enhancing layers that have a higher refractive index than the anti-reflection layer can also be present, likewise independently of one another, in the dielectric layer sequences. This can further improve and fine-tune the optical properties, in particular the reflection properties. The refractive-index-enhancing layers preferably contain a mixed silicon-metal nitride, such as mixed silicon-zirconium nitride, mixed silicon-aluminum nitride, mixed silicon-titanium nitride, or mixed silicon-hafnium nitride, particularly preferably mixed silicon-zirconium nitride. The proportion of zirconium is preferably between 15 and 45 wt.-%, particularly preferably between 15 and 30 wt.-%. The proportion of zirconium is preferably between 15 and 45 wt.-%, particularly preferably between 15 and 30 wt.-%. Alternative materials considered are, for example, $WO_3$, $Nb_2O_5$, $Bi_2O_3$, $TiO_2$, $Zr_3N_4$ and/or AlN. The refractive-index-enhancing layers are preferably arranged between the anti-reflection layer and the silver layer or between the matching layer (if present) and the anti-reflection layer. The geometric thickness of the refractive-index-enhancing layer is preferably from 5 nm to 30 nm, particularly preferably from 5 nm to 15 nm.

The dielectric layer sequences can also include smoothing layers umfassen. These are preferably arranged in each case below or above the matching layer adjacent a silver layer. The smoothing layers are preferably in direct contact with a matching layer. The smoothing to layers are responsible for optimization, in particular smoothing of the surface for an electrically conductive layer subsequently applied above. An electrically conductive layer deposited on a smoother surface has higher transmittance with simultaneously lower sheet resistance. The smoothing layers contain at least one non-crystalline oxide. The oxide can be amorphous or partially amorphous (and thus partially crystalline), but is not fully crystalline. The non-crystalline smoothing layers have low roughness and thus form an advantageously smooth surface for the layers to be applied above the smoothing layer. A non-crystalline first smoothing layer further brings about an improved surface structure of the layer deposited directly above the smoothing layer, which is preferably the first matching layer. The smoothing layers can, for example, contain at least one oxide of one or more of the elements tin, silicon, titanium, zirconium, hafnium, zinc, gallium, and indium. The smoothing layers preferably contain a noncrystalline mixed oxide. Most particularly preferably, the smoothing layers contain a mixed tin-zinc oxide. The mixed oxide can optionally also have dopants. The smoothing layers can, for example, contain an antimony-doped mixed tin-zinc oxide (SnZnOx:Sb). The mixed oxide preferably has a substoichiometric oxygen content. A method for production of mixed tin-zinc oxide layers by reactive cathodic sputtering is known, for example, from DE 198 48 751 C1. Oxygen is added as reaction gas during the deposition of the mixed tin-zinc oxide by cathodic sputtering. The layer thickness of the smoothing layers is preferably from 3 nm to 20 nm, particularly preferably from 4 nm to 12 nm. The smoothing layers preferably have a refractive index of at least 1.9 and of less than 2.2.

In another embodiment of the invention, the first dielectric layer comprises a first anti-reflection layer and a first matching layer. Likewise, the second dielectric layer comprises a second anti-reflection layer and a second matching layer; and the third dielectric layer comprises a third anti-reflection layer and a third matching layer. In the second surface region, in which a second silver layer follows the second dielectric layer, the second dielectric layer preferably includes two matching layers such that a matching layer is adjacent both the first silver layer and the second silver layer. The anti-reflection and matching layers have a refractive index of at least 1.9. The anti-reflection layers are preferably based on silicon nitride; the matching layers, based on zinc oxide. The matching layers are preferably arranged between the respective anti-reflection layer and the silver layer: This results in the layer sequence starting from the substrate: first anti-reflection layer-first matching layer-first silver layer-second matching layer-second anti-reflection layer, in the second surface region followed by a further second matching layer-second silver layer-third matching layer-third anti-reflection layer. Within the first surface region, the electrically conductive coating preferably contains no further dielectric layers. In the second surface region, further dielectric layers can be provided, in particular when there are more than two silver layers. The geometric thickness of the second anti-reflection layer is preferably from 50 nm to 100 nm, particularly preferably from 55 nm to 80 nm, in particular from 60 nm to 70 nm. The geometric thickness of the first anti-reflection layer is preferably from 10 nm to 50 nm, particularly preferably from 15 nm to 40 nm, in particular from 20 nm to 35 nm. The geometric thickness of the matching layers is preferably from 5 nm to 30 nm, particularly preferably from 8 nm to 12 nm.

In another embodiment of the invention, the first dielectric layer comprises a first anti-reflection layer, a first matching layer, and a first refractive-index-enhancing layer. Likewise, the second dielectric layer comprises a second anti-reflection layer, a second matching layer, and a second refractive-index-enhancing layer; and the third dielectric layer comprises a third anti-reflection layer, a third matching layer, and a third refractive-index-enhancing layer. In the second surface region, in which a second silver layer follows the second dielectric layer, the second dielectric layer preferably includes two matching layers such that a matching layer is adjacent both the first silver layer and the second silver layer. The anti-reflection and matching layers and the refractive-index-enhancing layers have a refractive index of at least 1.9. The refractive-index-enhancing layers have a higher refractive index than the anti-reflection layers, preferably at least 2.1. The anti-reflection layers are preferably based on silicon nitride; the matching layers, based on zinc oxide; the refractive-index-enhancing layers, based on a mixed silicon-metal nitride, such as mixed silicon-zirconium nitride or mixed silicon-hafnium nitride. The matching layers preferably have the least distance from the silver layer, while the refractive-index-enhancing refractive index increasing layers are arranged between the matching layers and the anti-reflection layers. This results in the layer sequence starting from the substrate: first anti-reflection layer-first refractive-index-enhancing layer-first matching layer-first silver layer-second matching layer-second refractive-index-enhancing layer-second anti-reflection layer, in the second surface region followed by a further second matching layer-second silver layer-third matching layer-third refractive-index-enhancing layer-third anti-reflection layer. The electrically conductive coating preferably contains no further dielectric layers within the first surface region. In the second surface region, further dielectric layers can be provided, in particular when there are more than two silver layers. The geometric thickness of the upper anti-reflection layer is preferably from 25 nm to 100 nm, particularly preferably from 30 nm to 80 nm. The geometric thickness of the lower anti-reflection layer is preferably from 10 nm to 50 nm, particularly preferably from 15 nm to 40 nm, in particular from 20 nm to 35 nm. The geometric thickness of the matching layers is preferably from 5 nm to 30 nm, particularly preferably from 8 nm to 12 nm. The geometric thickness of the refractive-index-enhancing layers is preferably from 5 nm to 30 nm, particularly preferably from 5 nm to 15 nm.

In another advantageous embodiment of the invention, the first dielectric layer comprises a first anti-reflection layer, a first matching layer, a first refractive-index-enhancing layer, and a first smoothing layer. Likewise, the second dielectric layer comprises a second anti-reflection layer, a second matching layer, a second refractive-index-enhancing layer, and a second smoothing layer; and the third dielectric layer comprises a third anti-reflection layer, a third matching layer, a third refractive-index-enhancing layer, and, optionally, a third smoothing layer. A third smoothing layer is provided in particular when the electrically conductive coating includes more than two silver layers. In the second surface region, in which a second silver layer follows the second dielectric layer, the second dielectric layer preferably includes two matching layers such that a matching layer is adjacent both the first silver layer and the second silver layer. The anti-reflection, matching, and smoothing layers and the refractive-index-enhancing layers have a refractive index of at least 1.9. The refractive-index-enhancing layers have a higher refractive index than the anti-reflection layers, preferably at least 2.1. The anti-reflection layers are preferably based on silicon nitride; the matching layers, based on zinc oxide; the refractive-index-enhancing layers, based on a mixed silicon-metal nitride, such as mixed silicon-zirconium nitride or mixed silicon-hafnium nitride. The matching layers preferably have the least distance from the silver layer, whereas the refractive-index-enhancing layers are arranged between the matching layers and the anti-reflection layers. In each case, the smoothing layers are preferably arranged below or above the matching layer adjacent a silver layer. The smoothing layers are preferably in direct contact with a matching layer. The smoothing layers most particularly preferably contain a mixed tin-zinc oxide. This results in the layer sequence starting from the substrate: first anti-reflection layer-first refractive-index-enhancing layer-first smoothing layer-first matching layer-first silver layer-second matching layer-second smoothing layer-second refractive-index-enhancing layer-second anti-reflection layer, followed in the second surface region by another second matching layer-second silver layer-third matching layer-third refractive-index-enhancing layer-third anti-reflection layer. The electrically conductive coating preferably contains no further dielectric layers within the first surface region. In the second surface region, further dielectric layers can provided, in particular when there are more than two silver layers. When there are more than two silver layers, a third smoothing layer is also preferably used within the third dielectric layer sequence. The geometric thickness of the upper anti-reflection layer is preferably from 25 nm to 100 nm, particularly preferably from 30 nm to 80 nm. The geometric thickness of the lower anti-reflection layer is preferably from 10 nm to 50 nm, particularly preferably from 15 nm to 40 nm, in particular from 20 nm to 35 nm. The geometric thickness of the matching layers is preferably from 5 nm to 30 nm, particularly preferably from 8 nm to 12 nm. The geometric thickness of the refractive-index-enhancing layers is preferably from 5 nm to 30 nm, particularly preferably from 5 nm to 15 nm. The layer thickness of the smoothing layers is preferably from 3 nm to 20 nm, particularly preferably from 4 nm to 12 nm.

Since all dielectric layer sequences can be formed independently of one another, combinations of the above-described embodiments are also possible, with the first, second, and/or third dielectric layer/layer sequence formed according to one embodiment and the remaining dielectric layers/layer sequences formed according to one or more other embodiments. This results in the following preferred layer sequences in the first surface region of the electrically conductive coating (in each case, starting from the substrate, i.e., that surface on which the electrically conductive coating is deposited):

- first anti-reflection layer-first silver layer-upper anti-reflection layer
- first anti-reflection layer-first silver layer-second matching layer-second anti-reflection layer
- first anti-reflection layer-first silver layer-second matching layer-second refractive-index-enhancing layer-second anti-reflection layer
- first anti-reflection layer-first matching layer-first silver layer-second anti-reflection layer
- first anti-reflection layer-first matching layer-first silver layer-second matching layer-second anti-reflection layer
- first anti-reflection layer-first matching layer-first silver layer-second matching layer-second refractive-index-enhancing layer-second anti-reflection layer
- first anti-reflection layer-first refractive-index-enhancing layer-first matching layer-first silver layer-second anti-reflection layer
- first anti-reflection layer-first refractive-index-enhancing layer-first matching layer-first silver layer-second matching layer-second anti-reflection layer
- first anti-reflection layer-first refractive-index-enhancing layer-first matching layer-first silver layer-second matching layer-second refractive-index-enhancing layer-second anti-reflection layer Further layers, at least a second silver layer and a third dielectric layer, are present in the second surface region. The third dielectric layer can, for its part, also comprise the layer sequences of dielectric layers mentioned. In the second surface region of the electrically conductive coating, a third or further silver layers and a fourth and further dielectric layer sequences can also be present.

In an advantageous embodiment, the electrically conductive coating includes at least one metallic blocking layer. The blocking layer can be arranged below and/or above the silver layer and preferably makes direct contact with the silver layer. The blocking layer is then positioned between the silver layer and the dielectric layer/layer sequence. The blocking layer serves as oxidation protection for the silver layer in particular during temperature treatments of the coated pane, as typically occur during bending processes. The blocking layer preferably has a geometric thickness of less than 1 nm, for example, 0.1 nm to 0.5 nm. The blocking layer is preferably based on titanium or a nickel-chromium alloy.

The blocking layer changes the optical properties of the electrically conductive coating only insignificantly and is preferably present in all the embodiments described above. Particularly preferably, a blocking layer is, in each case, arranged directly above the silver layer, i.e., between the silver layer and the following dielectric layer (sequence), where it is particularly effective. This results in the following preferred layer sequences in the first surface region of the electrically conductive coating (in each case, starting from the substrate, i.e., that surface on which the electrically conductive coating is deposited):

first anti-reflection layer-first silver layer-first blocking layer-second anti-reflection layer first anti-reflection layer-first silver layer-first blocking layer-second matching layer-second anti-reflection layer first anti-reflection layer-first silver layer-first blocking layer-second matching layer second refractive-index-enhancing layer-second anti-reflection layer first anti-reflection layer-first matching layer-first silver layer-first blocking layer-second anti-reflection layer first anti-reflection layer-first matching layer-first silver layer-first blocking layer-second matching layer-second anti-reflection layer first anti-reflection layer-first matching layer-first silver layer-first blocking layer-second matching layer-second refractive-index-enhancing layer-second anti-reflection layer first anti-reflection layer-first refractive-index-enhancing layer-first matching layer-first silver layer-first blocking layer-second anti-reflection layer first anti-reflection layer-first refractive-index-enhancing layer-first matching layer-first silver layer-first blocking layer-second matching layer-second anti-reflection layer first anti-reflection layer-first refractive-index-enhancing layer-first matching layer-first silver layer-first blocking layer-second matching layer-second refractive-index-enhancing layer-second anti-reflection layer Optionally, in each case, an additional blocking layer can be arranged directly below each of the silver layers, i.e., in each case between the silver layer and the underlying dielectric layer (sequence).

The projector is arranged in the interior relative to the composite pane and irradiates the composite pane via the interior-side surface of the inner pane. It is oriented toward the HUD region and irradiates it to generate the HUD projection. If the composite pane is a windshield, the projector is arranged in the vehicle interior. According to the invention, the radiation of the projector is predominantly p-polarized, i.e., has a p-polarized radiation component greater than 50%. The higher the proportion of the p-polarized radiation in the total radiation of the projector, the higher the intensity of the desired projection image and the weaker the intensity of undesirable reflections on the surfaces of the composite pane. The proportion of p-polarized radiation of the projector is preferably at least 70%, particularly preferably at least 80%, and in particular at least 90%. In a particularly advantageous embodiment, the radiation of the projector is essentially purely p-polarized—the p-polarized radiation proportion is thus 100% or deviates only insignificantly therefrom. The indication of the polarization direction is based here on the plane of incidence of the radiation on the composite pane. The expression "p-polarized radiation" refers to radiation whose electric field oscillates in the plane of incidence. "S-polarized radiation" refers to radiation whose electric field oscillates perpendicular to the plane of incidence. The plane of incidence is spanned by the vector of incidence and the surface normal of the composite pane in the geometric center of the irradiated region.

The radiation of the projector preferably strikes the composite pane at an angle of incidence from 45° to 70°, in particular from 60° to 70°. These angles are preferred in particular when the composite pane is used as a windshield. In an advantageous embodiment, the angle of incidence deviates from Brewster's angle by at most 10°. The p-polarized radiation is then reflected only insignificantly at the surfaces of the composite pane such that no ghost image is generated. The angle of incidence is the angle between the vector of incidence of the projector radiation and the interior-side surface normal (i.e., the surface normal on the interior-side external surface of the composite pane) in the geometric center of the HUD region. Brewster's angle for an air/gas transition in the case of soda lime glass which is generally customary for window panes is 56.5°. Ideally, the angle of incidence should be as close as possible to Brewster's angle. However, angles of incidence of 65°, which are common for HUD projection assemblies, are easily implemented in vehicles, and deviate only slightly from Brewster's angle, can, for example, also be used such that the reflection of the p-polarized radiation increases only insignificantly.

Since the reflection of the projector radiation occurs substantially at the electrically conductive coating and not at the external pane surfaces, it is not necessary to arrange the external pane surfaces at an angle relative to one another in order to avoid ghost images. The external surfaces of the composite pane are, consequently, preferably arranged substantially parallel to one another. The thermoplastic intermediate layer is preferably not implemented wedge-like, but, instead, has a substantially constant thickness, in particular even in the vertical course between the upper edge and the lower edge of the composite pane, just like the inner pane and the outer pane. A wedge-like intermediate layer would, in contrast, have a variable thickness, in particular an increasing thickness, in the vertical course between the lower edge and the upper edge of the composite pane. The intermediate layer is typically formed from at least one thermoplastic film. Since standard films are significantly more economical than wedge films, the production of the composite pane is more economical.

The outer pane and the inner pane are preferably made of glass, in particular of soda lime glass, which is customary for window panes. In principle, however, the panes can also be made of other types of glass (for example, borosilicate glass, quartz glass, aluminosilicate glass) or transparent plastics (for example, polymethyl methacrylate or polycarbonate). The thickness of the outer pane and the inner pane can vary widely. Preferably used are panes with a thickness in the range from 0.8 mm to 5 mm, preferably from 1.4 mm to 2.5 mm, for example, those with the standard thicknesses of 1.6 mm or 2.1 mm.

The outer pane, the inner pane, and the thermoplastic intermediate layer can be clear and colorless, but also tinted or colored. In a preferred embodiment, the total transmittance through the composite pane (including the reflection coating) is greater than 70%. Thus, the composite pane is suitable as a windshield of a motor vehicle. The term "total transmittance" is based on the process for testing the light permeability of motor vehicle windows specified by ECE-R 43, Annex 3, § 9.1. The outer pane and the inner panes can, independently of one another, be non-prestressed, partially prestressed, or prestressed. If at least one of the panes is to be prestressed, this can be thermal or chemical prestressing.

In an advantageous embodiment, the outer pane is tinted or colored. This can reduce the exterior-side reflectivity of the composite pane, in particular in the first surface region, as a result of which the impression of the pane is more pleasing for an outside viewer. However, to ensure the legally required light transmittance of 70% (total transmittance) for windshields, the outer pane should preferably have light transmittance of at least 80%, particularly preferably of at least 85%. The inner pane and the intermediate layer are preferably clear, i.e., not tinted or colored. For example, green or blue colored glass can be used as the outer pane.

The composite pane is preferably a windshield, which is particularly preferably curved in one or a plurality of spatial directions, as is customary for motor vehicle window panes, wherein typical radii of curvature are in the range from approx. 10 cm to approx. 40 m. The windshield can, however, also be flat, for example, when it is intended as a pane for buses, trains, or tractors.

The thermoplastic intermediate layer contains at least one thermoplastic polymer, preferably ethylene vinyl acetate (EVA), polyvinyl butyral (PVB), or polyurethane (PU) or mixtures or copolymers or derivatives thereof, particularly preferably PVB. The thermoplastic intermediate layer can comprise one or more thermoplastic bonding films. The thickness of the intermediate layer is preferably from 0.2 mm to 2 mm, particularly preferably from 0.3 mm to 1 mm, for example, 0.76 mm.

The invention further includes a method for producing a projection assembly according to the invention. First, an outer pane having an exterior-side surface and an interior-side surface or an inner pane having an exterior-side surface and an interior-side surface is provided. The electrically conductive coating is optionally deposited on the interior-side surface of the inner pane or of the outer pane. The electrically conductive coating comprises at least a first dielectric layer or layer sequence, a first electrically conductive layer based on silver, a second dielectric layer or layer sequence, a second electrically conductive layer based on silver, and a third dielectric layer or layer sequence. Within the first surface region, part of the layer stack of the electrically conductive coating is removed again, after which, at least in one sub-region of the first surface region, the electrically conductive coating consists of, in the following order, a first dielectric layer or layer sequence, a first electrically conductive layer based on silver, and a second dielectric top layer or layer sequence. There are no other electrically conductive layers in this sub-region of the first surface region. The outer pane or inner pane coated with the electrically conductive coating with a correspondingly reduced layer stack of the coating in the first surface region is then joined to an inner pane or an outer pane to form a composite pane. For this purpose, a thermoplastic intermediate layer is placed on the interior-side surface of the inner pane or on the interior-side surface of the outer pane. One of said interior-side surfaces already carries the electrically conductive coating such that it faces in the direction of the thermoplastic intermediate layer. The stack formed by the pane and the thermoplastic intermediate layer ends with an inner pane or outer pane, and the resulting layer stack composed of the inner pane, the thermoplastic intermediate layer, and outer pane is laminated to form a composite pane. A projector, whose radiation is predominantly p-polarized, is provided for producing the projection assembly. The projector is oriented such that when the projector is operated, its p-polarized radiation strikes the first surface region of the electrically conductive coating.

The composite pane can be produced by methods known per se. The outer pane and the inner pane are laminated together via the intermediate layer, for example, by autoclave methods, vacuum bag methods, vacuum ring methods, calender methods, vacuum laminators, or combinations thereof. The bonding of the outer pane and the inner pane is customarily done under the action of heat, vacuum, and/or pressure.

The electrically conductive coating is preferably applied by physical vapor deposition (PVD) onto a pane surface, particularly preferably by cathodic sputtering ("sputtering"), most particularly preferably by magnetron-enhanced cathodic sputtering ("magnetron sputtering").

The coating is preferably applied before lamination. Instead of applying the coating on a pane surface, it can, in principle, also be provided on a carrier film that is arranged in the intermediate layer.

Layers of the electrically conductive coating within the first surface region are preferably removed by means of a laser method, particularly preferably by laser ablation. For this purpose, the laser is focused on one of the layers of the electrically conductive coating to be removed and is preferably guided over the coating by means of a scanner. The laser beam is absorbed by layers of the layer stack, for example, a silver-based layer or blocking layer. The layer in question as well as the layers above it are removed by spalling, whereas the underlying layers are retained. In this way, the layers of the electrically conductive coating to be removed are ablated. The substrate and the laser beam move relative to one another, whereby, optionally, the laser beam and/or the workpiece can be moved. Suitable laser scanners are commercially available and enable selective guidance of the laser beam over the stationary or equally movable workpiece. Preferably, a pulsed solid-state laser is used as the laser. It has proved to be advantageous to select the wavelength of the radiation of the laser in the range from 150 nm to 1200 nm, preferably in the range from 300 nm to 1200 nm, particularly preferably 400 nm to 1100 nm. This range is particularly suitable for processing the electrically conductive coating. Preferably, a solid-state laser is used, particularly preferably an IR laser, for example, with a wavelength of 1064 nm or a higher harmonic of this wavelength, e.g., 532 nm. The laser is operated in pulsed mode. This is particularly advantageous in terms of high power density and effective removal of the coating. The pulse energy is, for example, 10 µJ to 50 µJ per pulse. The pulse repetition rate is preferably 10,000 to 400,000 Hz, for example, 25,000 Hz. The scanning speed is preferably selected between 0.01 m/s and 5 m/s. The pulse duration of the laser is preferably less than or equal to 20 ns, particularly preferably less than or equal to 10 ps, in particular less than or equal to 400 fs.

The partial removal of the layer stack of the electrically conductive coating is preferably done after all layers of the electrically conductive coating have been applied. Alternatively, layers can also be removed during the deposition process. For this purpose, an abrasive step, in which one or more of the layers within the first surface region are removed again, is interposed between the individual deposition steps. For example, an electrically conductive coating comprising one, two, or three electrically conductive layers based on silver, as well as the corresponding dielectric layers, is first deposited over a large area of the surface of the pane. Then, in the HUD region of the pane, the electrically conductive coating just applied is completely removed. Finally, a layer stack comprising exactly one electrically conductive layer based on silver, as well as the required dielectric layers, are likewise deposited over a large-area on the surface of the pane. In the first surface region, this results in an electrically conductive coating consisting of a first dielectric layer or layer sequence, exactly one electrically conductive layer, and a second dielectric layer or layer sequence. In the second surface region, in contrast, there is an electrically conductive coating comprising two, three, or four electrically conductive layers. For example, ion-beam-based etching steps or laser ablation can be used as said abrasive steps. The coating is preferably applied by magnetron-enhanced cathodic sputtering. The de-coating can optionally be carried out outside the coating to system or within a separate section of the coating system.

If the electrically conductive coating is provided as a heatable coating, it is electrically contacted. For this purpose, bus bars that enable electrically conductively connecting the coating to a voltage source via electrical connection elements and cables are applied on the coating. Bus bars for the electrical contacting of the coating, their arrangement on an electrically conductive coating, and methods for applying the bus bars are well-known to the person skilled in the art. The bus bars are preferably implemented in the form of a printed and baked conductive structure. The printed bus bars contain at least one metal, preferably silver. Suitable silver printing pastes are commercially available and known to the person skilled in the art.

If the composite pane is to be curved, the outer pane and the inner pane are subjected to a bending process, preferably before lamination and preferably after the coating process. Preferably, the outer pane and the inner pane are bent congruently together (i.e., at the same time and by the same tool), since, thus, the shape of the panes is optimally matched for the subsequently occurring lamination. Typical temperatures for glass bending processes are, for example, 500° C. to 700° C. This temperature treatment also increases the transparency and reduces the sheet resistance of the electrically conductive coating.

The product features explained in the course of the description of the method also apply to the projection assembly and the composite pane, while, conversely, the features mentioned in the description of the projection assembly in the composite pane also apply to the method.

The invention also includes the use of a projection assembly according to the invention for a head-up display of a motor vehicle wherein the composite pane is the windshield of the motor vehicle and the projector, whose radiation is predominantly p-polarized, is oriented toward the HUD region. The above-described preferred embodiments apply mutatis mutandis to the use.

In the following, the invention is explained in detail with reference to drawings and exemplary embodiments. The drawings are schematic representations and are not true to scale. The drawings in no way restrict the invention.

Figure 2:
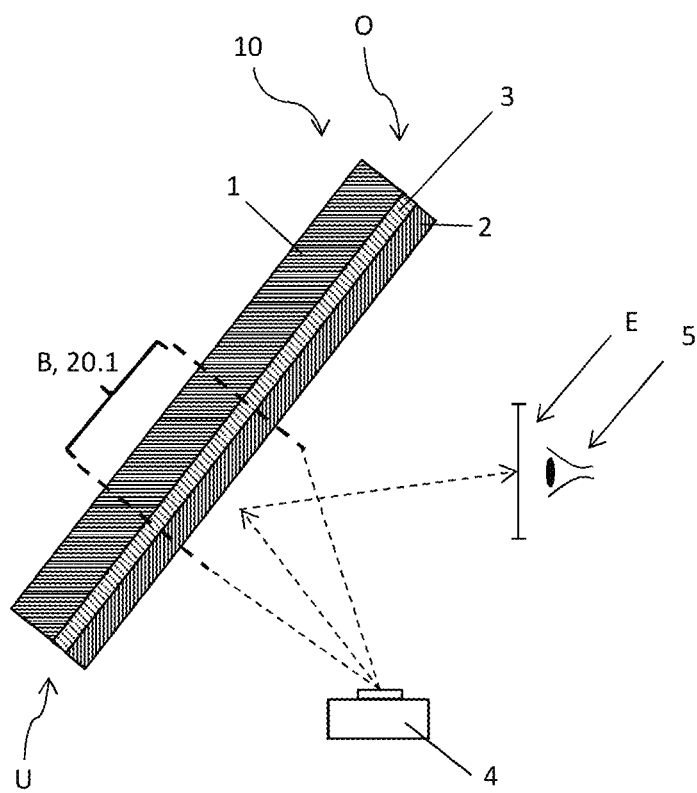
Figure 3:
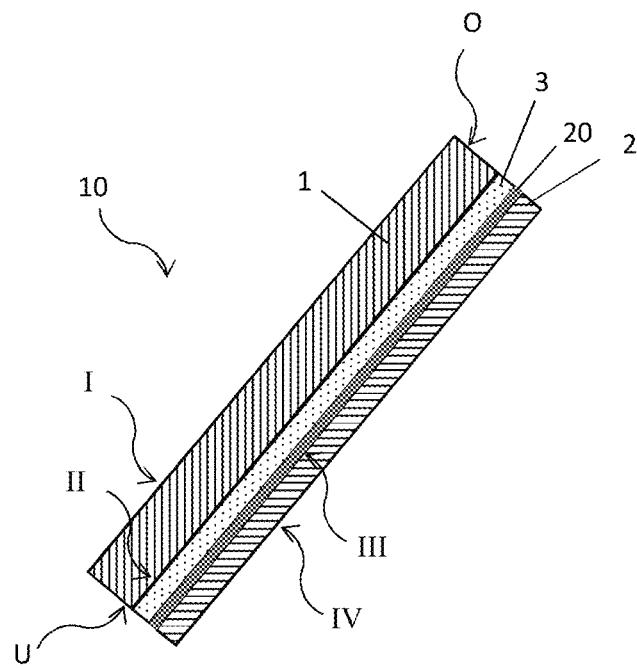
Figure 4A:
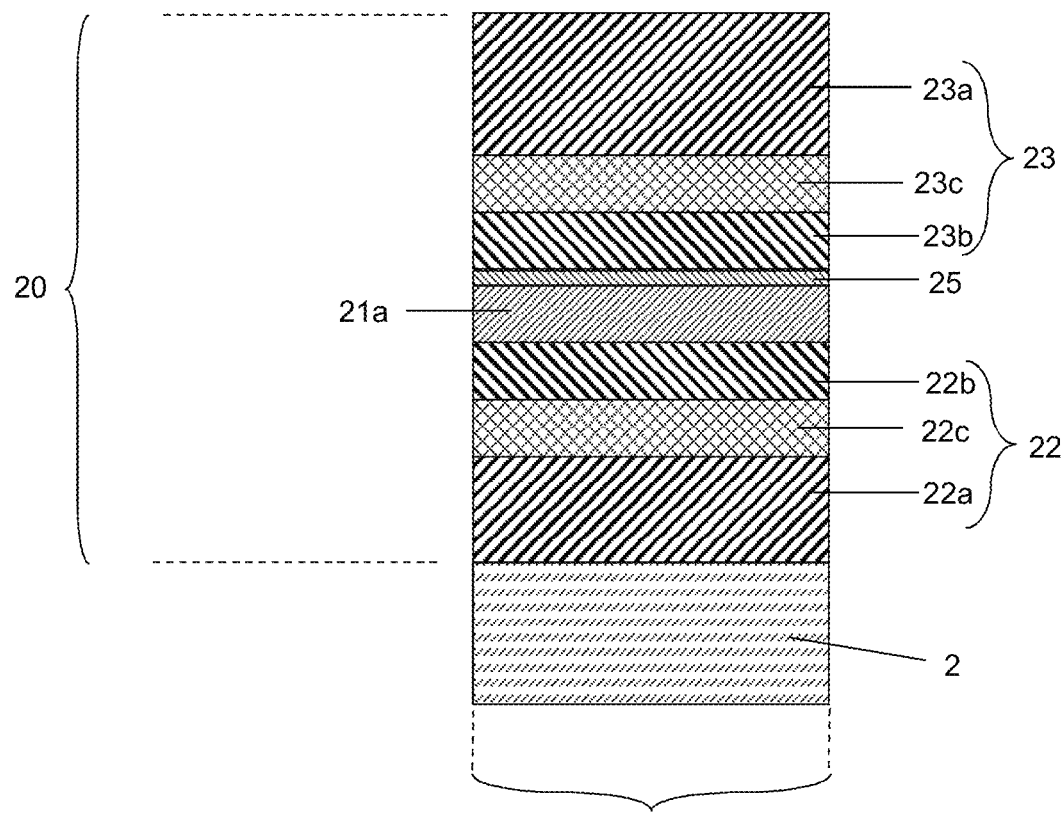
Figure 4B:
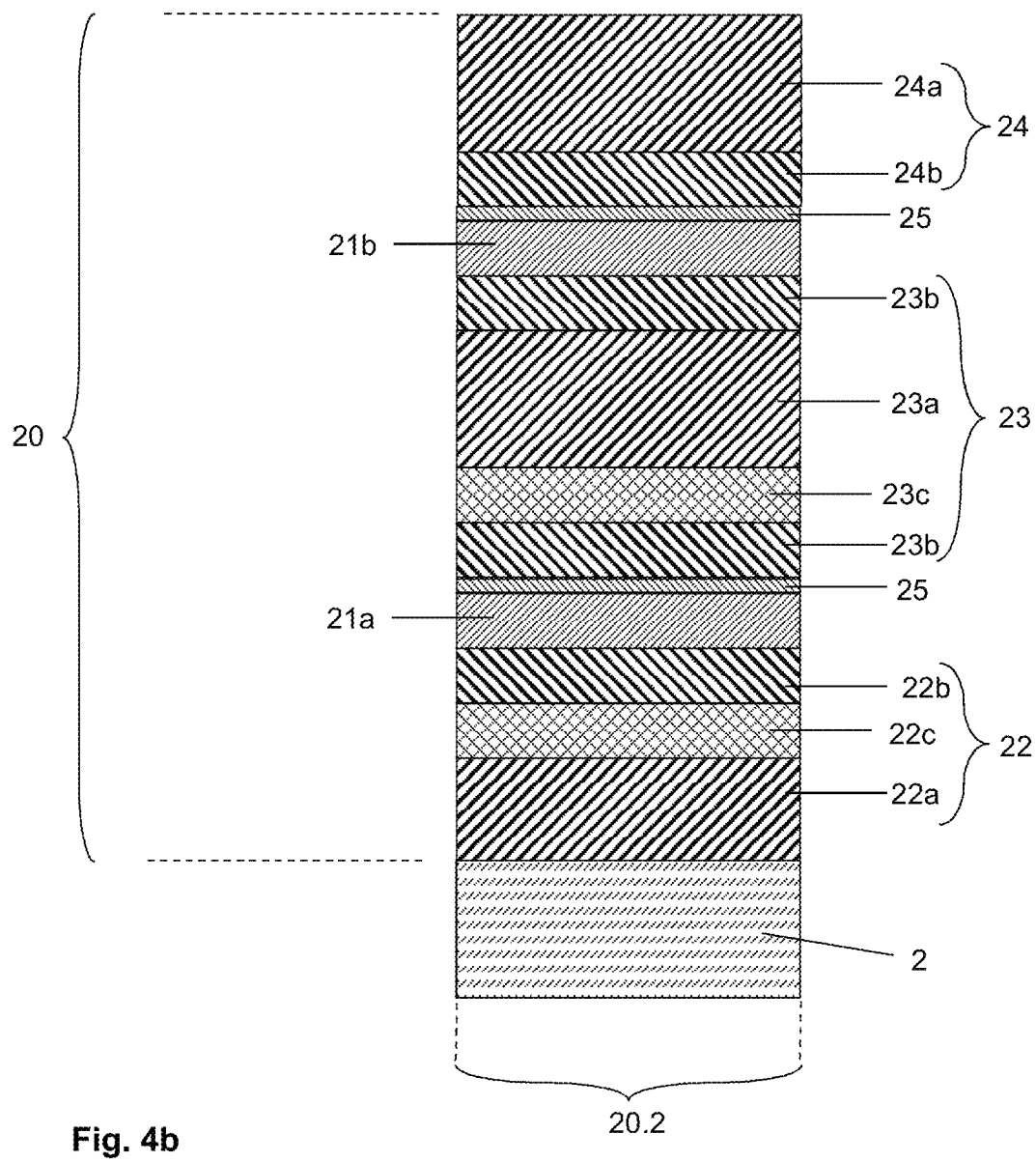
Figure 5A:
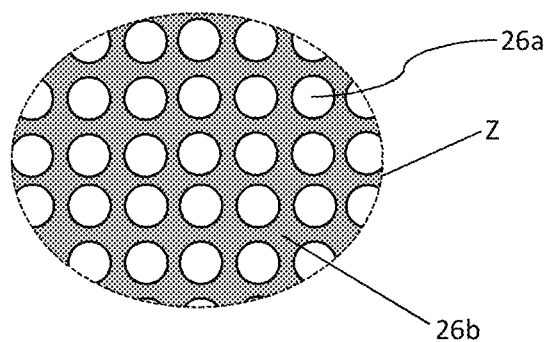
Figure 5B:
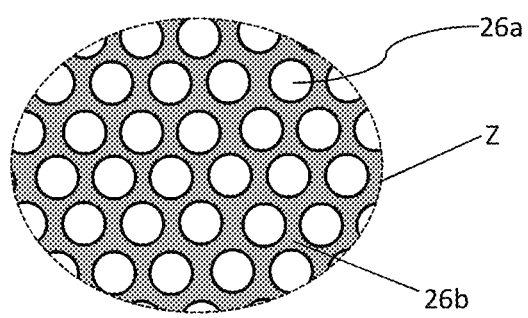
Figure 6A:
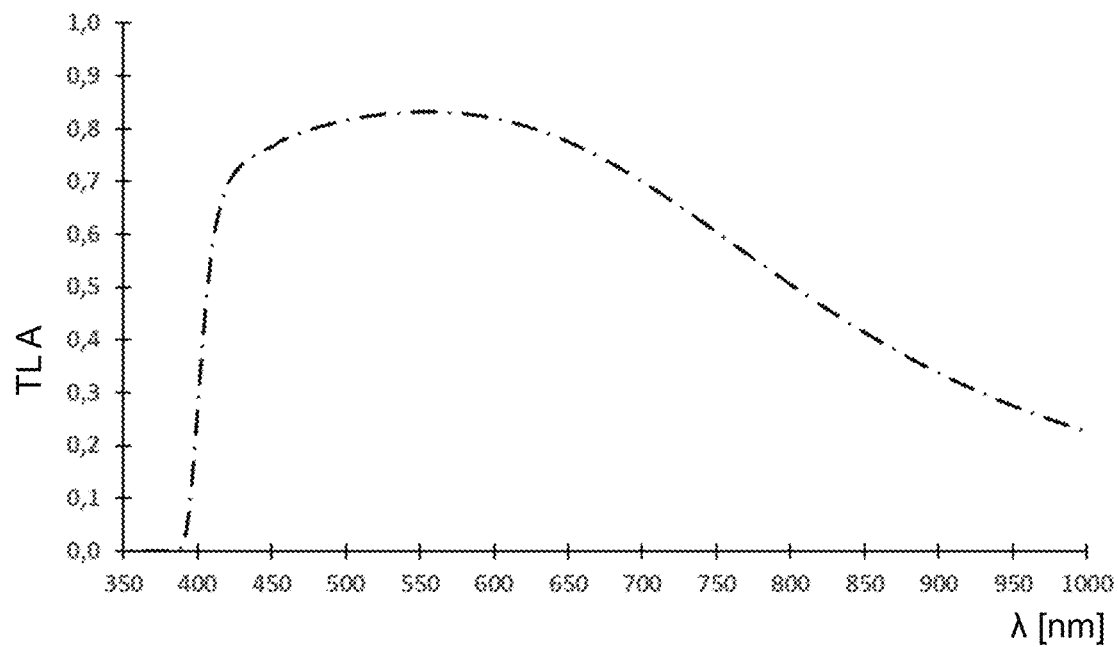
Figure 6B:
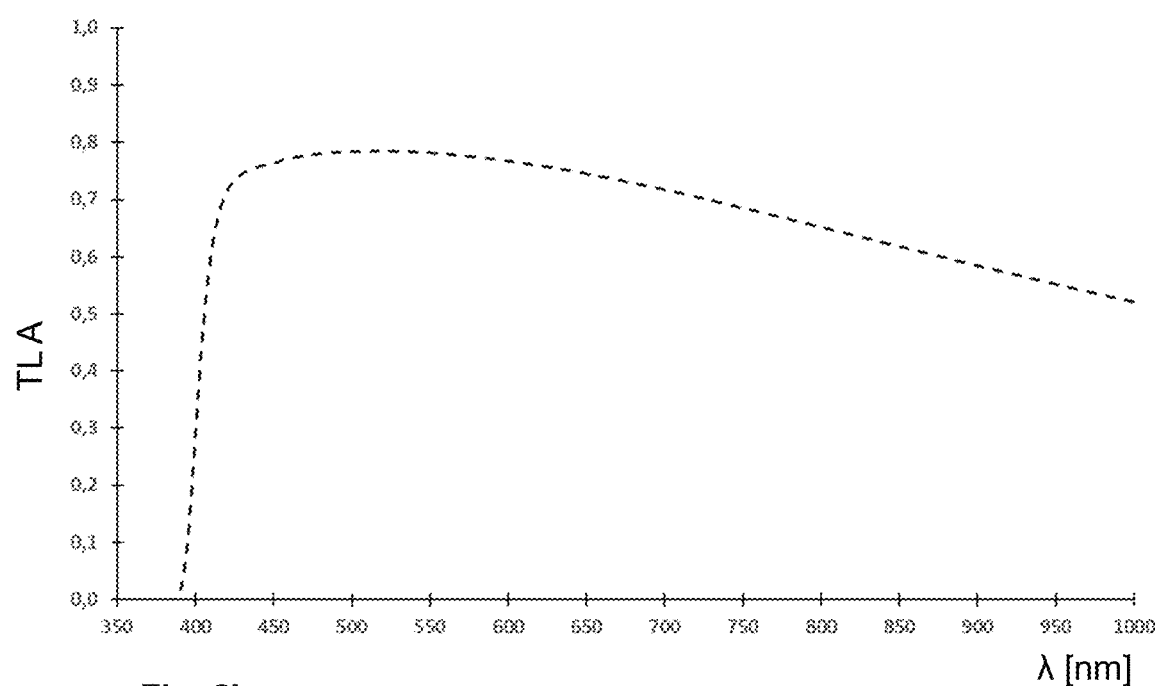
Figure 7A:
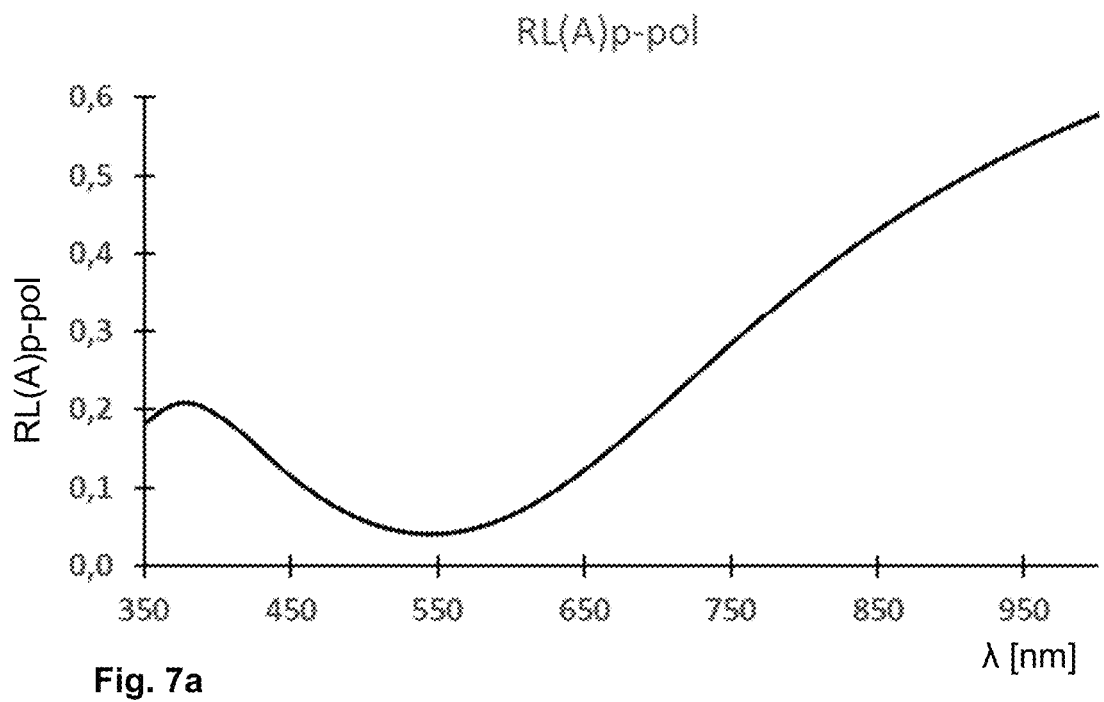
Figure 7B:
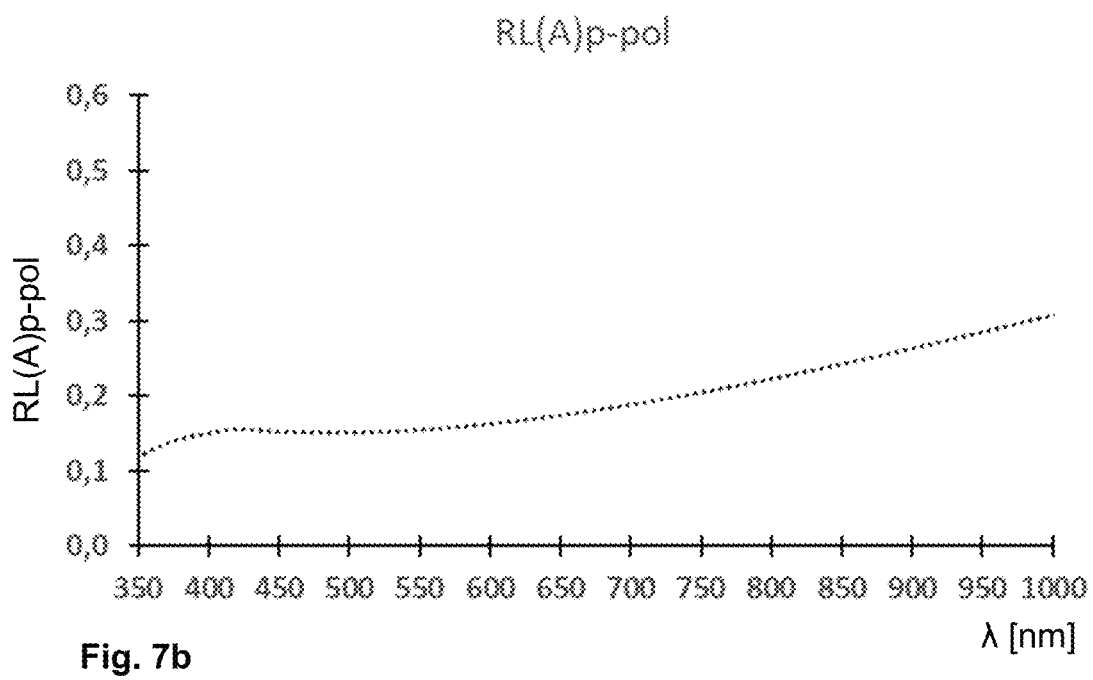

They depict:

FIG. 1 a plan view of a composite pane of a generic projection assembly,

FIG. 2 a cross-section through a generic projection assembly,

FIG. 3 a cross-section through a composite pane of a projection assembly according to the invention, FIG. 4a the layer sequence of an embodiment according to the invention of the electrically conductive coating 20 within the first surface region 20.1, FIG. 4b the layer sequence of an embodiment according to the invention of the electrically conductive coating 20 within the second surface region 20.2, FIG. 5a a composite pane 10 of a projection assembly according to the invention with first regions 26a and second regions 26b within the first surface region 20.1 within the enlarged detail Z, FIG. 5b another composite pane 10 of a projection assembly according to the invention with first regions 26a and second regions 26b within the first surface region 20.1 within the enlarged detail Z, FIG. 6a transmittance spectrum of the composite pane 10 according to Table 1 in the second surface region 20.2, FIG. 6b transmittance spectrum of the composite pane 10 according to Table 1 in the first surface region 20.1, FIG. 7a reflection spectrum of the composite pane 10 according to Table 1 for p-polarized radiation in the second surface region 20.2, and FIG. 7b reflection spectrum of the composite pane 10 according to Table 1 for p-polarized radiation in the first surface region 20.1.

FIG. 1 and FIG. 2 depict in each case a detail of a generic projection assembly for an HUD. The projection assembly comprises a composite pane 10 as a windshield, in particular the windshield of a passenger car. The projection assembly also comprises a projector 4 that is oriented toward a region of the composite pane 10. In this region, usually referred to as HUD region B, the projector 4 can generate images that are perceived by a viewer 5 (driver) as virtual images on the side of the composite pane 10 facing away from him when his eyes are situated within the so-called eyebox E.

The composite pane 10 is constructed from an outer pane 1 and an inner pane 2 that are joined to one another via a thermoplastic intermediate layer 3. Its lower edge U is arranged downward in the direction of the engine of the passenger car; its upper edge O, upward in the direction of the roof. In the installed position, the outer pane 1 faces the external surroundings; the inner pane 2, the vehicle interior. The composite pane 10 includes an electrically conductive coating 20, which comprises a first surface region 20.1 within the HUD region B and a second surface region 20.2 outside the HUD region B.

FIG. 3 depicts an embodiment of a composite pane 10 implemented according to the invention as a windshield of a motor vehicle. The outer pane 1 has an exterior-side surface I that faces the external surroundings in the installed position and an interior-side surface II that faces the interior in the installed position. Likewise, the inner pane 2 has an exterior-side surface III that faces the external surroundings in the installed position and an interior-side surface IV that faces the interior in the installed position. The outer pane 1 and the inner pane 2 are made, for example, of soda lime glass. The outer pane 1 has, for example, a thickness of 2.1 mm; the inner pane 2, a thickness of 1.6 mm or 2.1 mm. The intermediate layer 3 is formed, for example, from a PVB film with a thickness of 0.76 mm. The PVB film has an essentially constant thickness, apart from any surface roughness common in the art—it is not implemented as a so-called wedge film.

The exterior-side surface III of the inner pane 2 is provided with an electrically conductive coating 20 according to the invention, which is provided within the first surface region 20.1 of FIG. 1 as a reflection surface for the projector radiation and, additionally, within the second surface region 20.2 of FIG. 1 as an IR-reflecting coating.

According to the invention, the radiation of the projector 4 is p-polarized, in particular essentially purely p-polarized. Since the projector 4 irradiates the windshield 10 as a windshield at an angle of incidence of about 65°, which is close to Brewster's angle, the radiation of the projector is only insignificantly reflected at the external surfaces I, IV of the composite pane 10. In contrast, the electrically conductive coating 20 according to the invention is optimized within the first surface region 20.1 for reflection of p-polarized radiation. It serves as a reflection surface for the radiation of the projector 4 to generate the HUD projection.

FIG. 4a depicts the layer sequence of an embodiment of the electrically conductive coating 20 within the first surface region 20.1. The coating 20 is a stack of thin layers and includes exactly one electrically conductive layer 21a based on silver. There are no other electrically conductive layers in the first surface region 20.1 of the coating 20. A metallic blocking layer is arranged directly below the first electrically conductive layer 21a. A second dielectric layer sequence 23 consisting of, from bottom to top, a second matching layer 23b, a second refractive-index-enhancing layer 23c, and a second anti-reflection layer 23a is arranged above it. A first dielectric layer sequence 22 consisting of, from top to bottom, a first matching layer 22b, a first refractive-index-enhancing layer 22c, and a first anti-reflection layer 22a is arranged below the first electrically conductive layer 21a.

The layer structure depicted is intended merely as an example. For example, the dielectric layer sequences can also include more or fewer layers, provided at least one dielectric layer is present above and below the first conductive layer 21a. The dielectric layer sequences also need not be symmetrical. Exemplary materials and layer thicknesses can be found in the following example.

FIG. 4b depicts the layer sequence of an embodiment of the electrically conductive coating 20 within the second surface region 20.2. The coating 20 is a stack of thin layers and comprises a first dielectric layer sequence 22, which consists of, from bottom to top, i.e., starting from the substrate (here, inner pane 2) a first anti-reflection layer 22a, a first refractive-index-enhancing layer 22c, and a first matching layer 22b. The first electrically conductive layer 21a based on silver follows this dielectric layer sequence 22. A metallic blocking layer 25 is arranged directly below the first electrically conductive layer 21a. A second dielectric layer sequence 23 comprising, from bottom to top, a second matching layer 23b, a second refractive-index-enhancing layer 23c, and a second anti-reflection layer 23a, is arranged above it. As enumerated thus far, the layer structure of the electrically conductive coating 20 in the second surface region 20.2 corresponds to the layer structure in the first surface region 20.1 described in FIG. 4a. In the second surface region 20.2 of FIG. 4b, a further second matching layer 23b is arranged on the second anti-reflection layer 23a such that the second dielectric layer sequence 23 in the second surface region 20.2 consists of, from bottom to top, a second matching layer 23b, a second refractive-index-enhancing layer 23c, a second anti-reflection layer 23a, and another second matching layer 23b. A second conductive layer 21b based on silver with a blocking layer 25 situated thereon follows the further second matching layer 23b. Above the second conductive layer 21b, a third dielectric layer 24 ends the layer stack of the coating. The third dielectric layer 24 consists of, in the following order, from bottom to top, a third matching layer 24b and a third anti-reflection layer 24a, which ends the layer stack.

The layer structure of the electrically conductive coating 20 in the first surface region 20.1 (of FIG. 4a) was produced by first applying the layer structure of FIG. 4b over a large area on the interior-side surface of the inner pane 2 by means of magnetron sputtering, and, after that, in a first surface region 4.1, the third dielectric layer 24, the second electrically conductive layer 21b with an associated blocking layer 25, and the further second matching layer 23b positioned under the second electrically conductive layer 21b are removed by laser ablation.

The layer structure shown is provided merely by way of example. For example, the dielectric layer sequences can also include more or fewer layers, provided that, in each case, there is at least one dielectric layer above and below the first conductive layer 21a. The dielectric layer sequences also need not be symmetrical. Exemplary materials and layer thicknesses can be found in the following example.

The respective layer sequences of a composite pane 10 according to the invention with an electrically conductive coating 20 on the interior-side surface III of the inner pane 2 within the first surface region 20.1 and the second surface region 20.2 are shown in Table 1, together with the materials and the geometric layer thicknesses of the individual layers. The dielectric layers can, independently of one another, be doped, for example, with boron or aluminum.

TABLE 1

| | | Layer Thicknesses | |
| --- | --- | --- | --- |
| Material | Reference Characters | First surface region 20.1 | Second surface region 20.2 |
| Soda lime glass | 1 | 2.1 mm | 2.1 mm |
| PVB | 3 | 0.76 mm | 0.76 mm |
| $Si_3N_4$ | 20  24a | — | 29.0 nm |
| ZnO | 24b | — | 10.0 nm |
| NiCr | 25 | — | 0.3 nm |
| Ag | 21b | — | 8.0 nm |
| ZnO | 23b | — | 10.0 nm |
| $Si_3N_4$ | 23a | 49.3 nm | 49.3 nm |
| $SiZrN_x$ | 23c | 10.0 nm | 10.0 nm |
| ZnO | 23b | 10.0 nm | 10.0 nm |
| NiCr | 25 | 0.3 nm | 0.3 nm |
| Ag | 21a | 12.0 nm | 12.0 nm |
| ZnO | 22b | 10.0 nm | 10.0 nm |
| $SiZrN_x$ | 22c | 10.0 nm | 10.0 nm |
| $Si_3N_4$ | 22a | 10.2 nm | 10.2 nm |
| Soda lime glass | 2 | 2.1 mm | 2.1 mm |

The transmittance and reflection properties as well as the color values of the composite pane of Table 1 in the first surface region 20.1 and in the second surface region 20.2 of the electrically conductive coating 20 are given in Table 2. TLA is the transmittance in the visible spectral range of the light spectrum and RL(A) is the reflection in the visible range of the light spectrum measured at an angle of 8° at the exterior-side surface I of the outer pane 1. Moreover, TTS is the total solar transmittance measured per DIN ISO13831. RL(A) p-pol is the reflectivity for p-polarized light essential for image quality and is determined at the exterior-side surface IV of the inner pane 2 at 65°. The corresponding color values a*p-pol and b*p-pol can be used to determine whether there is an advantageous neutral color impression of the HUD image.

TABLE 2

| | Properties of composite pane 10 of Table 1 | |
|---|---|---|
| | first surface region 20.1 | second surface region 20.2 |
| TL A | 73.9 | 82.0 |
| RL(A) | 20.9 | 9.6 |
| RL(A)p-pol | 18.7 | 5.9 |
| a*p-pol | 1.3 | 19.0 |
| b*p-pol | 3.0 | −19.9 |
| TTS | 60.2 | 54.7 |

A comparison of the properties of the electrically conductive coating 20 in the first surface region 20.1 and in the second surface region 20.2 shows that, in both regions, transmittance suitably high for use as a windshield of greater than 70% in the visible region of the spectrum was achievable. In the second surface region 20.2, there is advantageously low reflection RL(A) at the exterior-side surface I of the outer pane 1 such that the electrically conductive coating in the second surface region 20.2 is well-suited for large-area application on the pane. Furthermore, in the second surface region 20.2, advantageously low total solar transmittance is observed. In the second surface region 20.2, the composite pane 10 has comparatively low reflectivity for p-polarized light and depicts a colored HUD image. The first surface region 20.1 of the coating 20 is optimized for use in the HUD region of the pane. In this region, advantageously high reflectivity for p-polarized light is observed and an HUD image with a neutral color impression is obtained.

FIG. 5a depicts an embodiment of the composite pane 10 of a projection assembly according to the invention within the enlarged detail Z of FIG. 1. The composite pane 10 essentially corresponds to that described in FIG. 3. In contrast thereto, the first surface region 20.1 is provided with first regions 26a and second regions 26b. The first regions 26a have a layer sequence of the electrically conductive coating 20 that corresponds to that described in FIG. 4a. The second regions 26b provide a continuous surface that surrounds the first regions 26a and have the layer stack of the electrically conductive coating described in FIG. 4b. The first regions 26b are arranged in the form of a square grid.

FIG. 5b depicts another embodiment of the composite pane 10 of a projection assembly according to the invention, likewise shown within the enlarged detail Z of FIG. 1. The composite pane of FIG. 5b essentially corresponds to the composite pane of FIG. 5a, wherein, in contrast thereto, the first regions 26a are arranged in the form of a hexagonal grid.

FIG. 6a shows a transmittance spectrum of the composite pane 10 with electrically conductive coating 20 of Table 1 in the second surface region 20.2, whereas FIG. 6b shows a transmittance spectrum of this composite pane 10 in the first surface region 20.1. FIG. 7a shows a reflection spectrum of the composite pane 10 of Table 1 in the second surface region 20.2, whereas FIG. 7b shows the corresponding reflection spectrum in the first surface region 20.1. The reflection spectra were recorded with a light source that emits p-polarized radiation of uniform intensity in the spectral range observed, when irradiated via the inner pane 2 (the so-called interior-side reflection) at an angle of incidence of 65° relative to the interior-side surface normal. The reflection measurement is thus approximated to the situation in the projection assembly. It can already be seen from the graphic presentation of the spectra that, in the first surface region 20.1 optimized according to the invention for the HUD region, a substantially smoother spectrum is achieved in the relevant spectral range from 400 nm to 680 nm. This ensures a more color-neutral display of the HUD projection.

LIST OF REFERENCE CHARACTERS 10 composite pane
1 outer pane
2 inner pane
3 thermoplastic intermediate layer
4 projector
5 viewer/vehicle driver
20 electrically conductive coating
20.1 first surface region of the electrically conductive coating
20.2 second surface region of the electrically conductive coating
21a first electrically conductive layer
21b second electrically conductive layer
22 first dielectric layer
22a anti-reflection layer
22b matching layer
22c refractive-index-enhancing layer
23 second dielectric layer
23a second anti-reflection layer
23b second matching layer
23c second refractive-index-enhancing layer
24 third dielectric layer
24a third anti-reflection layer
24b third matching layer
25 metallic blocking layer
26a first regions of a grid
26b second regions of a grid
O upper edge of the composite pane 10
U lower edge of the composite pane 10
B HUD region of the composite pane 10
E eyebox
Z detail
I exterior-side surface of the outer pane 1 facing away from the intermediate layer 3
II interior-side surface of the outer pane 1 facing the intermediate layer 3
III exterior-side surface of the inner pane 2 facing the intermediate layer 3
IV interior-side surface of the inner pane 2 facing away from the intermediate layer 3

The invention claimed is:

1. A projection assembly for a head-up display (HUD), at least comprising:
a composite pane with an electrically conductive coating, comprising an outer pane and an inner pane that are joined to one another via a thermoplastic intermediate layer, and
a projector that is oriented toward a HUD region;
wherein
radiation of the projector is predominantly p-polarized,
the electrically conductive coating has a first surface region within the HUD region and a second surface region outside the HUD region,
the electrically conductive coating has at least one sub-region within the first surface region, in which the electrically conductive coating consists of, in the following order, a first dielectric layer or first dielectric layer sequence, a first electrically conductive layer based on silver, and a second dielectric layer or second dielectric layer sequence and is adapted to reflect p-polarized radiation, the electrically conductive coating within the second surface region comprises, in the following order, at least the first dielectric layer or first dielectric layer sequence, the first electrically conductive layer based on silver, the second dielectric layer or second dielectric layer sequence, a second electrically conductive layer based on silver, and a third dielectric layer or third dielectric layer sequence
and wherein the electrically conductive coating in the first surface section within the HUD region is obtainable from the electrically conductive coating in the second surface section using a subtractive method.

2. The projection assembly according to claim 1, wherein the electrically conductive coating within the entire first surface region consists of, in the following order, the first dielectric layer or first dielectric layer sequence, the first electrically conductive layer based on silver, and the second dielectric layer or second dielectric layer sequence and is adapted to reflect p-polarized radiation.

3. The projection assembly according to claim 1, wherein the electrically conductive coating within the first surface region has a regular or irregular grid of first regions, in which the electrically conductive coating consists of, in the following order, the first dielectric layer or first dielectric layer sequence, the first electrically conductive layer based on silver, and the second dielectric layer or second dielectric layer sequence and is adapted to reflect p-polarized radiation, and of second regions, in which the electrically conductive coating corresponds to the electrically conductive coating in the second surface region.

4. The projection assembly according to claim 1, wherein the electrically conductive coating in the first surface region has at least one sub-region, in which the first dielectric layer or first dielectric layer sequence has a refractive index of at least 1.9 and/or the second dielectric layer or second dielectric layer sequence has a refractive index of at least 1.9.

5. The projection assembly according to claim 1, wherein the electrically conductive coating in the first surface region has at least one sub-region, in which a ratio of an optical thickness of the second dielectric layer or second dielectric layer sequence to an optical thickness of the first dielectric layer or first dielectric layer sequence is at least 1.7.

6. The projection assembly according to claim 1, wherein the composite pane with the electrically conductive coating in the HUD region has, in a spectral range from 400 nm to 680 nm, an averaged reflectance for p-polarized radiation of at least 10%.

7. The projection assembly according to claim 1, wherein the electrically conductive coating includes no dielectric layers of which the refractive index is less than 1.9.

8. The projection assembly according to claim 1, wherein
the first dielectric layer sequence comprising a first anti-reflection layer, and a first matching layer is arranged below the first electrically conductive layer, and the first dielectric layer sequence has a refractive index of at least 1.9, and/or
the second dielectric layer sequence comprising a second anti-reflection layer, and a second matching layer is arranged above the first electrically conductive layer, and the second dielectric layer sequence has a refractive index of at least 1.9.

9. The projection assembly according to claim 1, wherein
the first dielectric layer sequence comprising a first anti- reflection layer, a first matching layer, and a first refractive-index-enhancing layer, is arranged below the first electrically conductive layer, and the first dielectric layer sequence has a refractive index of at least 1.9, and/or
the second dielectric layer sequence comprising a second anti- reflection layer, a second matching layer, and a second refractive-index-enhancing layer, is arranged above the first electrically conductive layer, and the second dielectric layer sequence has a refractive index of at least 1.9.

10. The projection assembly according to claim 1, wherein the electrically conductive coating comprises at least one metallic blocking layer, which is arranged above and/or below the first and second electrically conductive layers and has a geometric thickness of less than 1 nm.

11. The projection assembly according to claim 1, wherein external surfaces of the composite pane are arranged substantially parallel to one another.

12. The projection assembly according to claim 1, wherein the electrically conductive coating is arranged on a surface of the outer pane or of the inner pane facing the thermoplastic intermediate layer or within the intermediate layer.

13. A method for producing a projection assembly according to claim 1, comprising:
a) providing an outer pane having an exterior-side surface and an interior-side surface or an inner pane having an interior-side surface and an exterior-side surface is provided,
b) depositing an electrically conductive coating comprising, in the following order, at least a first dielectric layer or first dielectric layer sequence, a first electrically conductive layer based on silver, a second dielectric layer or second dielectric layer sequence, a second electrically conductive layer based on silver, and a third dielectric layer or third dielectric layer sequence on the interior-side surface of the outer pane or the interior-side surface of the inner pane,
c) removing layers of the electrically conductive coating within a first surface region, wherein after removal at least in one sub-region of the first surface region the electrically conductive coating consists of, in the following order, the first dielectric layer or first dielectric layer sequence, the first electrically conductive layer based on silver, and the second dielectric layer or second dielectric layer sequence,
d) placing a thermoplastic intermediate layer on the interior-side surface of the outer pane or the interior-side surface of the inner pane and the layer stack ends with an inner pane or an outer pane,
e) laminating the layer stack composed of at least the inner pane, the thermoplastic intermediate layer, and the outer pane to form a composite pane,
f) providing a projector, whose radiation is predominantly p-polarized, and
g) orienting the projector such that its radiation is adapted to strike the electrically conductive coating of the composite pane in the first surface region.

14. The method according to claim 13, wherein in step c), layers of the electrically conductive coating are removed by laser.

15. A method comprising providing a projection assembly according to claim 1 for a head-up display of a motor vehicle, wherein the composite pane is the windshield of the motor vehicle.

16. The projection assembly according to claim 5, wherein the ratio is at least 1.8.

17. The projection assembly according to claim 16, wherein the ratio is at least 1.9.

18. The projection assembly according to claim 6, wherein averaged reflectance for p-polarized radiation is at least 15%.

19. The projection assembly according to claim 8, wherein
- the first anti-reflection layer is based on silicon nitride, and the first matching layer is based on zinc oxide, and/or
- the second anti-reflection layer is based on silicon nitride, and the second matching layer is based on zinc oxide.

20. The projection assembly according to claim 9, wherein
- the first anti-reflection layer is based on silicon nitride, the first matching layer is based on zinc oxide, and the first refractive-index-enhancing layer is based on a mixed silicon-metal nitride, and/or
- the second anti-reflection layer is based on silicon nitride, the second matching layer is based on zinc oxide, and the second refractive-index-enhancing layer is based on a mixed silicon-metal nitride.

* * * * *